United States Patent [19]

Desmarais

[11] 4,309,322

[45] Jan. 5, 1982

[54] PAINT STRIPPER

[75] Inventor: Leon O. Desmarais, Old Hickory, Tenn.

[73] Assignee: Sterling Drug Inc., New York, N.Y.

[21] Appl. No.: 160,487

[22] Filed: Jun. 18, 1980

[51] Int. Cl.³ ............................................. C08L 91/00
[52] U.S. Cl. .............................. 260/28.5 R; 134/38; 252/170; 252/171
[58] Field of Search .................. 134/38; 252/170, 171; 260/28.5 R

[56] References Cited

U.S. PATENT DOCUMENTS 3,615,827 10/1971 Murphy ................................. 134/38
3,950,185 4/1976 Toyama et al. ....................... 134/38
4,200,671 4/1980 Krajewski et al. ................... 134/38

*Primary Examiner*—Melvyn I. Marquis
*Attorney, Agent, or Firm*—Armstrong, Nikaido, Marmelstein & Kubovcik

[57] ABSTRACT

A non-flammable, non-acid, non-caustic stripper for paint and varnish which is thixotropic and suitable for application by brush or spray. A method for making the stripper easily and inexpensively is also disclosed.

16 Claims, No Drawings

PAINT STRIPPER

BACKGROUND OF THE INVENTION

This application refers to paint strippers, and more particularly this application refers to a non-flammable thixotropic paint and varnish stripper and a method for making the same.

There are many paint and varnish removers presently available for both industrial use and home use. Most of these paint and varnish removers as is well-known in the art, employ volatile solvents which are extremely flammable, or employ caustic ingredients and are, therefore, dangerous to use. Many prior art paint and varnish removers are in liquid form which adds to the difficulty in using them since the liquid drips, splashes, and otherwise is difficult to control. There is, and has been, for many years, a need for a safe, non-flammable, non-caustic paint and varnish remover which does not possess any of the aforesaid disadvantages.

SUMMARY OF THE INVENTION

It is, therefore, a primary object of the present invention to provide a paint and varnish stripper which is free of the aforementioned and other such disadvantages.

It is another object of the present invention to provide a paint and varnish stripper which is easy and safe to use.

It is still another object of the present invention to provide a paint and varnish stripper which is non-flammable and does not drip.

It is yet another object of the present invention to provide a paint and varnish stripper, consistent with the foregoing objects, which is relatively inexpensive to manufacture.

It is a further object of the present invention to provide a method for making a paint and varnish stripper of the type mentioned which is straightforward and relatively inexpensive.

Consistent with the foregoing objects, the paint and varnish stripper of the present invention has methylene chloride as it major ingredient and also includes methanol and paraffin wax as an evaporation retardent. In addition, it includes petroleum naphtha, Cellosolve, Carbopol Resin 941 as a thickener, and Ethomeen T-15. A minor amount of water is also included and perfume is included merely to mask the solvent odors.

In the method of making the paint and varnish stripper of this invention, it is important that the temperature be maintained at from about 70° to about 80° F. The preferred temperature is about 70° F. It is also important that the ingredients be added with mixing, in a particular order and that the Carbopol Resin be sifted when added to the mixture. First, the methylene chloride is charged to a suitable container equipped with a suitable mixer. If necessary, the temperature of the methylene chloride is adjusted to from about 70° to about 80° F. The paraffin wax is melted and slowly added to the methylene chloride while mixing until completely dispersed and the petroleum naphtha and Cellosolve are added while mixing, always maintaining the temperature at from about 70° to about 80° F. The Carbopol 941 is sifted into the mixture to avoid lumping and the mixing is continued until it is completely dispersed. The methanol, Ethomeen T-15, and perfume are mixed in a separate vessel and then carefully added to the main batch with continuous mixing. The preferred rate of the mixing paddles is from about 160 to about 180 rotations per minute, with 170 rotations per minute being preferred. The water is then slowly added in a gentle stream insuring that the water blends in as fast as it is added. Mixing is continued until the mixture is uniformly blended, usually about 1 hour.

It should be pointed out that this paint and varnish remover has been referred to as non-flammable. By "non-flammable" is meant a mixture having a flash point in excess of 100° F. under ASTM D56 using the tag closed cup method. The flash point is the temperature at which the mixture will flash even if it immediately self-extinguishes. In the case of the instant composition, the flash point is 115° F. and the flame is immediately self-extinguished.

DESCRIPTION OF THE PREFERRED EMBODIMENTS

The composition of the instant invention comprises the following ingredients and proportions:

| Ingredient | Percent by Weight |
|---|---|
| methylene chloride | 66–72 |
| paraffin wax | 1–3 |
| Saf-T-Sol | 8–12 |
| Cellosolve | 3–6 |
| Carbopol Resin 941 | 0.2–1 |
| methanol | 8–12 |
| Ethomeen T-15 | 1–3 |
| water | 2–3 |

In addition, a suitable perfume could be added in an amount of from 0.2–0.5 percent by weight.

The Saf-T-Sol is petroleum naphtha.

Cellosolve is ethylene glycol monoethyl ether.

Carbopol 941 is a cross-linked polyacrylic acid having a molecular weight of about 1,250,000.

Ethomeen T-15 is described as a polyoxyethylene glycol (5) tallow oil amine.

An important and advantageous property of the composition is that it is thixotropic. By "thixotropic" is meant, as is wellknown in the art, the property of a colloidal gel to liquify when agitated and to return to a jelly-like form when at rest. Thus, the composition can be applied by a brush as a liquid but will, immediately after application, return to a jelly-like form and not drip. Similarly, the composition can be made as a sprayable composition by using a lesser amount of Carbopol Resin than would be used in the brushing composition. Preferred amounts are shown in the following examples which are presented for illustrative purposes only and not for limitation:

EXAMPLE I

| Ingredients | Percent by Weight |
|---|---|
| Methylene chloride | 68.5 |
| paraffin wax | 1.0 |
| Saf-T-Sol | 10.0 |
| Cellosolve | 5.0 |
| Carbopol Resin 941 | 0.5 |
| methanol | 10.8 |
| Ethomeen T-15 | 1.5 |
| Perfume #5725 | 0.2 |
| water | 2.5 |

The methylene chloride was charged to a stainless steel tank equipped with a mixer with the paddles rotating at about 170 RPM. The methylene chloride was heated to about 70° F. While mixing, the paraffin wax which had already been melted, was added slowly until completely dispersend. The Saf-T-Sol and Cellosolve were added insuring that the temperature remained at about 70° F. The Carbopol 941 was carefully sifted in insuring that no lumps were formed and mixing was continued for about 30 minutes. In the meantime, the methanol, Ethomeen T-15, and perfume were pre-blended in a separate vessel. The blend of methanol, Ethomeen T-15, and perfume was then added carefully to the batch with continuous mixing still at about 170 RPM. The water was added very slowly in a gentle stream insuring that the water blended in as fast as it was added. Mixing was continued for about one hour.

The product was thixotropic and non-flammable. It has excellent wash-off properties and cuts through finishes that other strippers will not affect. It was a clear to trace hazy thick fluid weighing 9.5 pounds per gallon.

In use, the composition is applied by brush in even, heavy coats, brushing in a single direction. The composition is left for between 5 and 15 minutes on varnish and between 15 and 30 minutes on paint to soften the finish. A second coat can be applied on heavy paint after 30 minutes. It is important that the finish be completely softened before attempting to remove. It is also preferred that the surface be kept wet with stripper at all times. The softened excess is removed with a putty knife or scraper. The stripped item may then be washed with either water or alcohol.

EXAMPLE II

| Ingredients | Percent by Weight |
|---|---|
| Methylene chloride | 69.8 |
| paraffin wax | 1.0 |
| Saf-T-Sol | 10.0 |
| Cellosolve | 5.0 |
| Carbopol Resin 941 | 0.2 |
| methanol | 10.8 |
| Ethomeen T-15 | 1.0 |
| Perfume #5725 | 0.2 |
| water | 2.0 |

This composition, suitable for spraying, was made following the same procedure as in Example I. The properties are essentially the same as the composition of Example I except that the viscosity is lower. The composition is applied by sprayer following the same procedure as described in Example I.

Accordingly, it will be appreciated that the objects set forth at the outset have been successfully achieved. While the invention has been described by reference to presently preferred embodiments, it is to be distinctly understood that the Examples are presented for illustrative purposes only. The invention may be otherwise variously embodied within the scope of the claims.

What is claimed is:

1. A non-flammable thixotropic stripper for paint and varnish comprising, in percent by weight, 66–72% of methylene chloride, 3–6% of ethylene glycol monoethyl ether, 8–12% of petroleum naphtha, 8–12% of methanol, 1–3% of an evaporation retardant, 0.2–1% of a thickener, 1–3% of polyoxyethylene glycol (5) tallow oil amine and the remainder water.

2. A non-flammable stripper for paint and varnish as claimed in claim 1, wherein said evaporation retardant is paraffin wax.

3. A non-flammable stripper for paint and varnish as claimed in claim 1, wherein said thickener is cross-linked polyacrylic acid.

4. A non-flammable stripper for paint and varnish as claimed in claim 1, further including a perfume.

5. A non-flammable stripper for paint and varnish as claimed in claim 1, consisting essentially of the following ingredients, in percent by weight:
methylene chloride: 66–72%
paraffin wax: 1–3%
petroleum naphtha: 8–12%
ethylene glycol monoethyl ether: 3–6%
cross-linked polyacrylic acid: 0.2–1%
methanol: 8–12%
polyoxyethylene glycol (5) tallow oil amine: 1–3%
water: 2–3%.

6. A non-flammable stripper for paint and varnish as claimed in claim 5, further including 0.2–0.5% of a perfume.

7. A non-flammable stripper for paint and varnish as claimed in claim 6, consisting essentially of, in percent by weight:
methylene chloride: 68.5%
paraffin wax: 1.0%
petroleum naphtha: 10.0%
ethylene glycol monoethyl ether: 5.0%
cross-linked polyacrylic acid: 0.5%
methanol: 10.8%
polyoxyethelene glycol (5) tallow oil amine: 1.5%
perfume: 0.2%
water: 2.5%.

8. A non-flammable stripper for paint and varnish as claimed in claim 6, consisting essentially of, in percent by weight:
methylene chloride: 69.8%
paraffin wax: 1.0%
petroleum ether: 10.0%
ethylene glycol monoethyl ether: 5.0%
cross-linked polyacrylic acid: 0.2%
methanol: 10.8%
polyoxyethylene glycol (5) tallow oil amine: 1.0%
perfume: 0.2%
water: 2.0%.

9. A method of making a non-flammable stripper for paint and varnish which comprises, in percent by weight, 66–72% of methylene chloride, 3–6% of ethylene glycol monoethyl ether, 8–12% of petroleum naphtha, 8–12% of methanol, 1–3% of paraffin wax, 0.2–1% of cross-linked polyacrylic acid, 1–3% of polyoxyethylene glycol (5) tallow oil amine, and water, said method comprising forming a primary mixture by insuring that the temperature of the methylene chloride is from about 70° to about 80° F., slowly adding melted paraffin wax under mixing until completely dispersed, adding the petroleum naphta and the ethylene glycol monoethylether while mixing and maintaining the temperature at from about 70° to about 80° F., and sifting in the cross-linked polyacrylic acid under mixing such that no lumps are formed and continuing mixing until completely dispersed, separately mixing the methanol and polyoxyethylene glycol (5) tallow oil amine to form a secondary mixture, carefully adding said secondary mixture to said primary mixture with continuous mixing, adding the water at a rate such that the water blends in as fast as it is added, and continuing to mix until a uniform blend is achieved.

10. A method as claimed in claim 9, wherein said temperature is 70° F.

11. A method as claimed in claim 9, wherein mixing is continued after adding said cross-linked polyacrylic acid for about 30 minutes.

12. A method as claimed in claim 9, wherein said stripper further comprises a perfume and said perfume is mixed into said secondary mixture.

13. A method as claimed in claim 9, wherein said mixing is continued after adding said water for about 1 hour.

14. A method as claimed in claim 9, 10, 11, 12 or 13, wherein said stripper consists essentially of, in percent by weight:
   methylene chloride: 66–72%
   paraffin wax: 1–3%
   petroleum naphtha: 8–12%
   ethylene glycol monoethyl ether: 3–6%
   cross-linked polyacrylic acid: 0.2–1%
   methanol: 8–12%
   polyoxyethylene glycol (5) tallow oil amine: 1–3%
   water: 2–3%.

15. A method as claimed in claim 14, wherein said stripper further includes 0.2 to 0.5% of a perfume.

16. A method as claimed in claim 15, wherein said stripper consists essentially of, in percent by weight:
   methylene chloride: 68.5%
   paraffin wax: 1.0%
   petroleum naphtha: 10.0%
   ethylene glycol monoethyl ether: 5.0%
   cross-linked polyacrylic acid: 0.5%
   methanol: 10.8%
   polyoxyethylene glycol (5) tallow oil amine: 1.5%
   perfume: 0.2%
   water: 2.5%.

* * * * *